(12) United States Patent
Chen et al.

(10) Patent No.: US 8,356,781 B2
(45) Date of Patent: Jan. 22, 2013

(54) SUCTION DEVICE

(75) Inventors: Shih-Hong Chen, Hsinchu (TW);
Jen-Yung Chang, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 212 days.

(21) Appl. No.: 13/004,030

(22) Filed: Jan. 11, 2011

(65) Prior Publication Data

US 2011/0210225 A1 Sep. 1, 2011

(30) Foreign Application Priority Data

Feb. 26, 2010 (TW) .............................. 99203571 U

(51) Int. Cl.
*F16B 47/00* (2006.01)
*A45D 42/14* (2006.01)
(52) U.S. Cl. ............... 248/206.2; 248/205.7; 248/205.8; 248/363
(58) Field of Classification Search ............... 248/205.5, 248/205.7, 205.8, 206.2, 206.3, 309.3, 362, 248/363, 683

See application file for complete search history.

(56) References Cited

U.S. PATENT DOCUMENTS

| | | | | | |
|---|---|---|---|---|---|
| 4,133,575 | A | * | 1/1979 | Mader | 248/205.8 |
| 4,351,451 | A | * | 9/1982 | Chung | 220/592.16 |
| 4,580,751 | A | * | 4/1986 | Panzer | 248/205.8 |
| 6,478,271 | B1 | * | 11/2002 | Mulholland | 248/205.8 |
| 6,932,306 | B2 | * | 8/2005 | Zou et al. | 248/205.5 |
| 7,226,026 | B2 | * | 6/2007 | Lin | 248/205.5 |
| 7,431,250 | B2 | * | 10/2008 | Chen | 248/205.5 |
| 7,628,362 | B2 | * | 12/2009 | Song | 248/205.8 |
| 7,690,610 | B2 | * | 4/2010 | Ristau | 248/206.2 |
| 7,850,133 | B2 | * | 12/2010 | Carnevali | 248/205.5 |
| 7,878,467 | B2 | * | 2/2011 | Chen et al. | 248/206.2 |

* cited by examiner

*Primary Examiner* — Tan Le
(74) *Attorney, Agent, or Firm* — Winston Hsu; Scott Margo

(57) ABSTRACT

A suction device includes a suction cup, a vertical bar connected with the suction cup, a first support cap having an opening that the vertical bar can be placed through and a first pair of gaps in the rim of the first support cap, a sleeve connected with the first support cap for containing the vertical bar, a linkage unit combined with the sleeve and the vertical bar, for controlling the vertical bar to move in the sleeve to pull the suction cup, to enable the suction functionality, and a second support cap between the suction cup and the first support cap, combined with the first support cap through relative rotation and having a second pair of gaps in the rim of the second support cap. The suction device can firmly attach to a curved surface when the second pair of gaps is under the first pair of gaps.

9 Claims, 20 Drawing Sheets

SUCTION DEVICE

BACKGROUND OF THE INVENTION

1. Field of the Invention

The present invention relates to a suction device, and more particularly, to a suction device capable of attaching to a curved surface.

2. Description of the Prior Art

Suction devices are widely used for hanging items by attaching to a surface of an object in daily life. Please refer to FIG. 1 and FIG. 2. FIG. 1 is a three dimensional schematic diagram of a conventional suction device 10, and FIG. 2 is a side view diagram of the suction device 10 when attaching to a curved surface. As can be seen from FIG. 1 and FIG. 2, since a base of a support unit 100 of the suction device 10 is circular, when the suction device 10 attaches to the curved surface, there is a wide gap between a rim of the base of the support unit 100 and the attached curved surface. Therefore, a suction cup 102 of the suction device 10 fails to attach to the curved surface closely as expected, causing air leak. As a result, the general suction device 10 can only attach to a plane surface, and is not suitable for attaching to a curved surface.

Take a car holder for example. One end of the conventional car holder is a suction device, which has the same structure as the suction device 10 in FIG. 1, utilized for attaching to a windshield in front of a car, and the other end of the conventional car holder is a holding seat for placing car electronics, such as a satellite radio or a satellite navigation device. However, since the suction device 10 is not suitable for attaching to a curved surface, the conventional car holder can only be fixed on a plane surface of the windshield in front of the car, and can not be fixed on a curved surface of other internal parts of the car, such as a dashboard. However, the line of sight of a driver may be blocked due to the car holder fixed on the windshield, causing a driving issue. Besides, the windshield is far from the front seats, and thus the user can not install the car holder easily. From the above, if a suction device can not attach to a curved surface closely, the application of the suction device is limited.

SUMMARY OF THE INVENTION

It is therefore an objective of the present invention provide a suction device capable of attaching to a curved surface.

An embodiment of the invention discloses a suction device. The suction device includes a suction cup including a top plane and a bottom plane attaching to a surface, a vertical bar installed with a through hole and connected with the suction cup, for pulling the suction cup, a first support cap having an opening in a center of the first support cap which the vertical bar is able to be placed through and a first pair of gaps symmetrical with respect to the center in a rim of the first support cap, a sleeve installed with a pair of guiders and connected with the first support cap, for containing the vertical bar, a linkage unit combined with the sleeve and the vertical bar, for controlling the vertical bar to move in the sleeve to pull the suction cup, to enable a suction functionality of the suction cup, and a second support cap installed between the suction cup and the first support cap, combined with the first support cap through relative rotation, and having an opening in a center of the second support cap which the vertical bar is able to be placed through and a second pair of gaps symmetrical with respect to the center of the second support cap in a rim of the second support cap.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
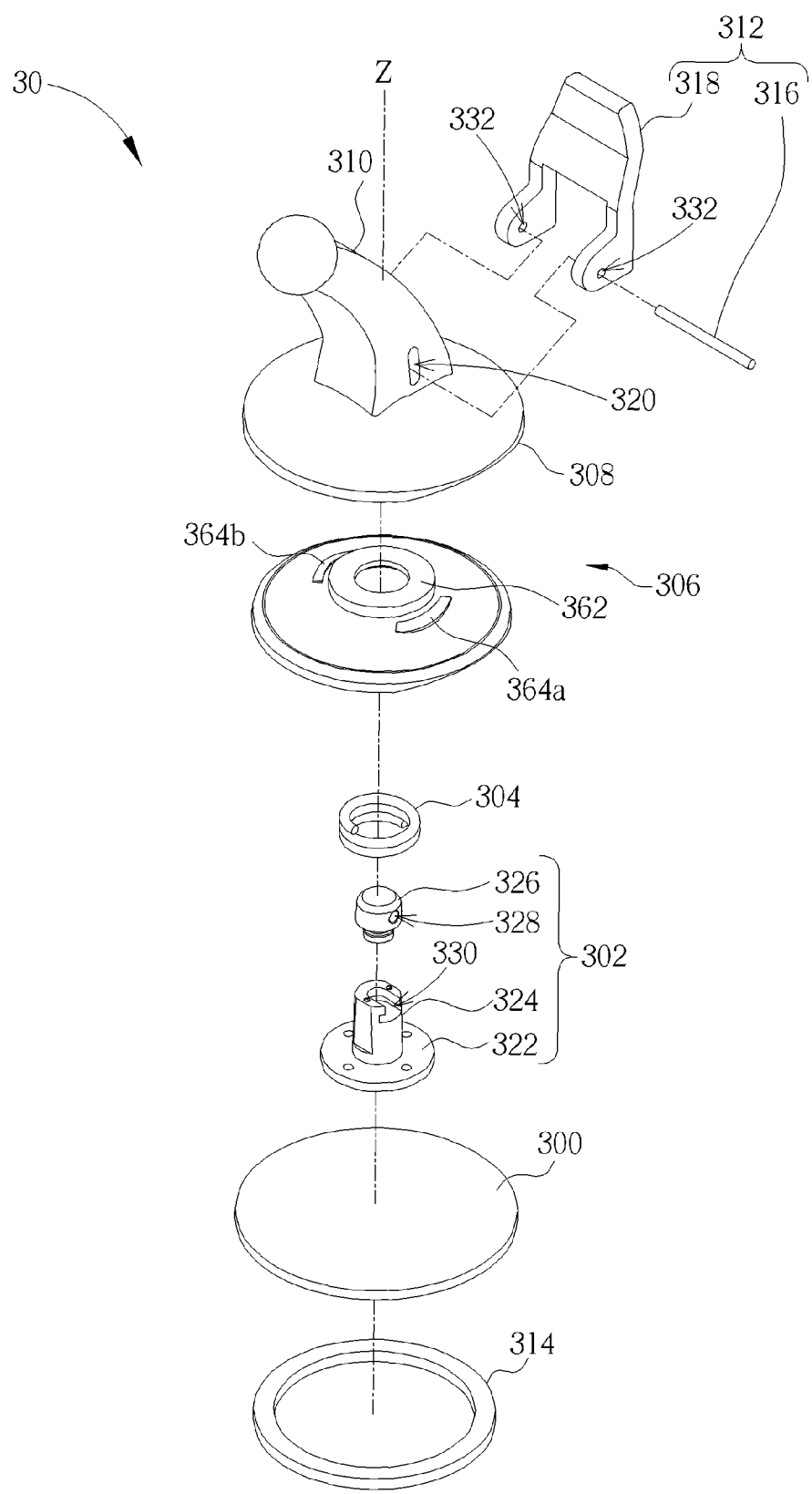
FIG. 3 and FIG. 4 are exploded view diagrams of a suction device according to an embodiment of the invention.
Figure 4:
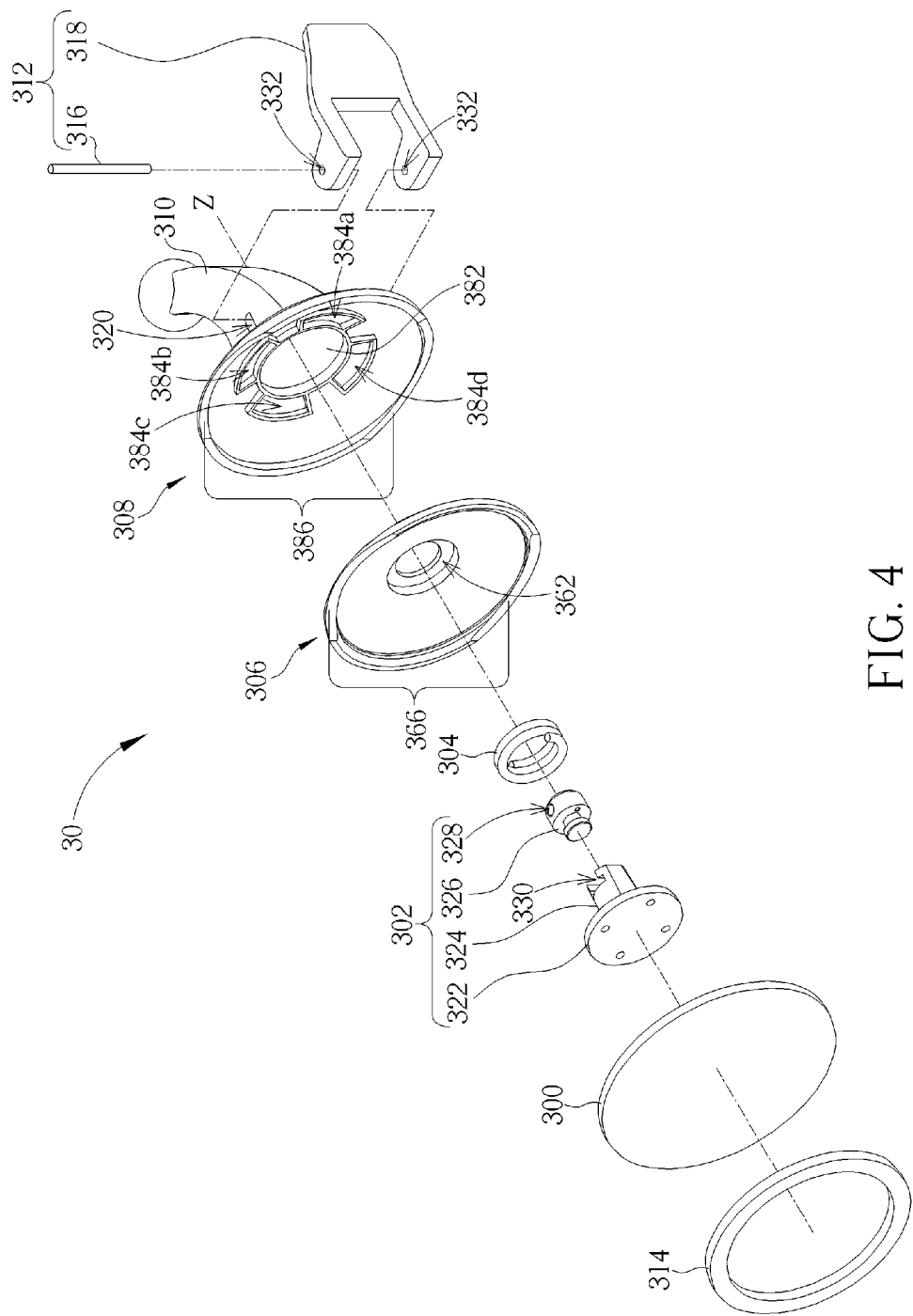

Please refer to FIG. 3 and FIG. 4, which are exploded view diagrams of a suction device 30 according to an embodiment of the invention. FIG. 3 is a top exploded view diagram of the suction device 30, and FIG. 4 is a bottom exploded view diagram of the suction device 30. Since some elements of the suction device 30 can be illustrated more clearly in the top exploded view diagram or the bottom exploded view diagram, please refer to FIG. 3 and FIG. 4 alternately. The suction device 30 includes a suction cup 300, a vertical bar 302, a spring 304, an auxiliary support cap 306, a main support cap 308, a sleeve 310, a linkage unit 312 and an adhesive unit 314. The linkage unit 312 includes a pin 316 and a handle 318. In FIG. 3 and FIG. 4, a central axis Z indicates a line connecting centers of the suction cup 300, the vertical bar 302, the spring 304, the auxiliary support cap 306, the main support cap 308, the sleeve 310 and the adhesive unit 314. Besides, materials of the vertical bar 302, the auxiliary support cap 306, the main support cap 308, the sleeve 310 and the linkage unit 312 can be plastic or metal, which is not limited.

The suction cup 300 is formed by an elastic material, and has a bottom plane combined with the adhesive unit 314, for attaching to a surface, and a center of a top plane is connected with the vertical bar 302. The adhesive unit 314 is a ring shape, and can be formed by a sticky rubber. The adhesive unit 314 is installed in a rim of the bottom plane of the suction cup 300, to fill a gap between the suction cup 300 and the attached surface so as to strengthen adhesiveness between the suction cup 300 and the attached surface. As a result, when the suction functionality of the suction cup 300 works, no matter the surface is smooth or rough material, such as glass, leather, plastic, wood or cement, the suction cup 300 can attach to the surface closely via the adhesive unit 314.

The vertical bar 302 includes a base 322, a body 324, and a rotation joint 326. The center of the base 322 is connected with the body 324, and the base 322 is installed in the suction cup 300. The body 324 is a cylinder having one end vertically connected with the base 322 and the other end with convex portions and a slot 330 at a horizontal direction. A horizontal through hole 328 at a upper part of the rotation joint 326 has a size that the pin 316 can be placed through. The diameter of a lower part of the rotation joint 326 is shorter than that of the upper part of the rotation joint 326. The rotation joint 326 is combined with the body 324 by the slot 330 such that the body 324 and the rotation joint 326 can be rotated relatively. Besides, there are concave portions (as shown in FIG. 4) formed on a bottom plane of the upper part of the rotation joint 326, corresponding to the convex portions on the top plane of the body 324. When the body 324 and the rotation joint 326 are rotated relatively by a specific angle, the concave portions and the convex portions are engaged, and the body 324 and the rotation joint 326 are combined stably. The vertical bar 302 is placed through the centers of the auxiliary support cap 306 and the main support cap 308, installed in the sleeve 310, and is controlled by the linkage unit 312 so as to move in the sleeve 310. The spring 304 is located between the suction cup 300 and the auxiliary support cap 306, and covers the vertical bar 302.

Both the auxiliary support cap 306 and the main support cap 308 support the suction cup 300, and can be rotated relatively. The suction device 30 is suitable for attaching to a curved surface preferably when the auxiliary support cap 306 and the main support cap 308 are rotated to be in specific relative positions. Note that, the main support cap 308 and the sleeve 310 are steadily combined, and the pin 316 combines the handle 318, the sleeve 310 and the rotation joint 326 together to perform joint control. When the main support cap 308 is controlled to be rotated, the rotation joint 326 is rotated accordingly, whereas the body 324 and the auxiliary support cap 306 are not rotated accordingly. Therefore, the auxiliary support cap 306 and the main support cap 308 are regarded as they are rotated relatively. The rotation joint 326 brings an advantage that a user can easily control the handle 318 to move horizontally, so as to rotate the main support cap 308 instead of rotating the auxiliary support cap 306 covered under the main support cap 308.

The auxiliary support cap 306 includes a raised portion 362, ribs 364a, 364b, and a pair of gaps 366. The raised portion 362 is installed on the center of the top plane of the auxiliary support cap 306; by seeing upwardly from the bottom plane of the auxiliary support cap 306, the raised portion 362 is a pit. A center of the raised portion 362 has an opening that the vertical bar 302 can be placed through. The spring 304 is located below the slot 362. The ribs 364a and 364b are installed on the top plane of the auxiliary support cap 306, and are symmetrical with respective to the central axis Z. The auxiliary support cap 306 is combined with the main support cap 308 by the raised portion 362 and the ribs 364a, 364b. The gaps 366 are symmetrical with respective to the center of the auxiliary support cap 306, and are located in the rim of the bottom plane of the auxiliary support cap 306. The gaps 366 are formed by slashing parts of the auxiliary support cap 306, such that the rim of the auxiliary support cap 306 becomes thinner from the inside to the outside.

The main support cap 308 includes a raised portion 382, grooves 384a, 384b, 384c, 384d, and a pair of gaps 386. The raised portion 382 is installed on the center of the main support cap 308; by seeing upwardly from the bottom plane of the main support cap 306, the raised portion 382 is a pit. A center of the raised portion 382 has an opening that the vertical bar 302 can be placed through. The grooves 384a-384d are installed on the bottom plane of the main support cap 308, and are equally distributed around a circumference of the central axis Z, where an angle between a central line of each groove and the central line of an adjacent groove is 90 degree. The main support cap 308 can be rotated by different angles to make any two of the grooves 384a-384d symmetrical with respect to the central axis Z be engaged with the ribs 364a and 364b of the auxiliary support cap 306, so as to be combined with the auxiliary support cap 306. In other words, the main support cap 308 is combined with the auxiliary support cap 306 in different relative positions. For example, take a position that the grooves 384b and 384d of the main support cap 308 are engaged with the ribs 364a and 364b of the auxiliary support cap 306 respectively as a relative position L0; after the main support cap 308 is rotated by 90 degree, the grooves 384a and 384c are engaged with the ribs 364a and 364b respectively, which is regarded as a different relative position L1.

The gaps 386 are symmetrical with respect to the center of the main support cap 308, and are located in the rim of the bottom plane of the main support cap 308. The formations of the gaps 386 are similar with the gaps 366 of the auxiliary support cap 306. When the main support cap 308 is combined with the auxiliary support cap 306 in different relative positions, the gaps 386 is located exactly under the gaps 366 correspondingly, or is not overlapped with the gaps 366. Follow the above example, when the main support cap 308 is combined with the auxiliary support cap 306 in the relative position L0, the gaps 366 are located exactly under the gaps 386. The lower gaps 366 of the auxiliary support cap 306 are required to be equal to or greater than the upper gaps 386 of the main support cap 308 in order to realize that the auxiliary support cap 306 is not exposed when seeing from the top plane of the main support cap 308. When the main support cap 308 is rotated by 90 degrees from the relative position L0 and is combined with the auxiliary support cap 306 in the relative position L1, the gaps 366 and the gaps 386 are not overlapped. Other than the above limitations of positions and relative sizes of the gaps, the invention does not limit actual sizes of the gaps 366 and the gaps 386, as long as the actual sizes do not affects the suction functionality of the suction device in practice.

In a word, the positions of the gaps 366 and the gaps 386 are overlapped or not overlapped according to different relative positions where the main support cap 308 and the auxiliary support cap 306 are combined through relative rotation. The idea of the invention is to flexibly alter the relative positions in which the main support cap 308 and the auxiliary support cap 306 are combined, so that the suction cup 300 can properly attach to a curved surface when the gaps 366 and the gaps 386 are in the overlapped positions.

Figure 1:
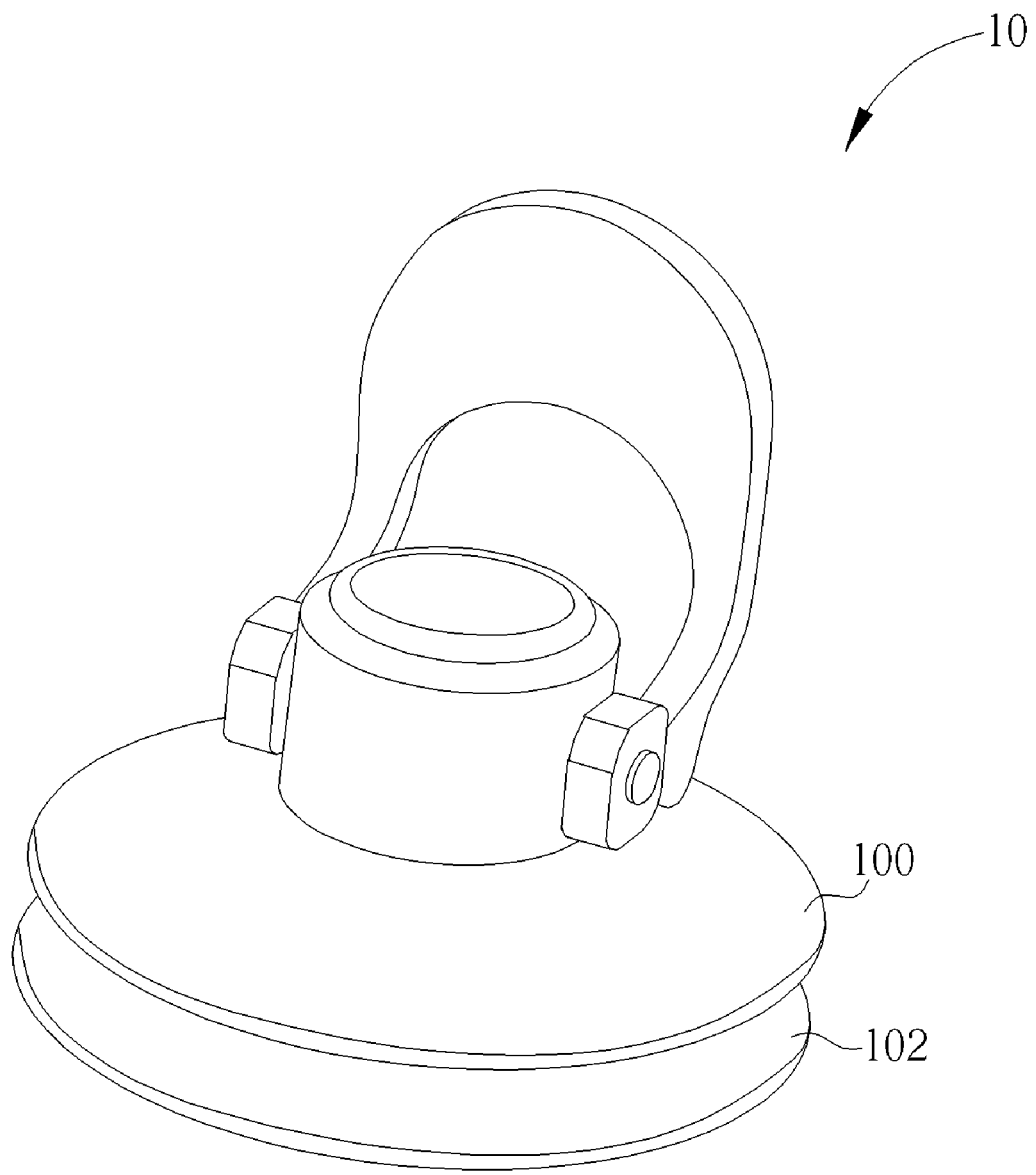
FIG. 1 is a three dimensional schematic diagram of a conventional suction device.
Figure 2:
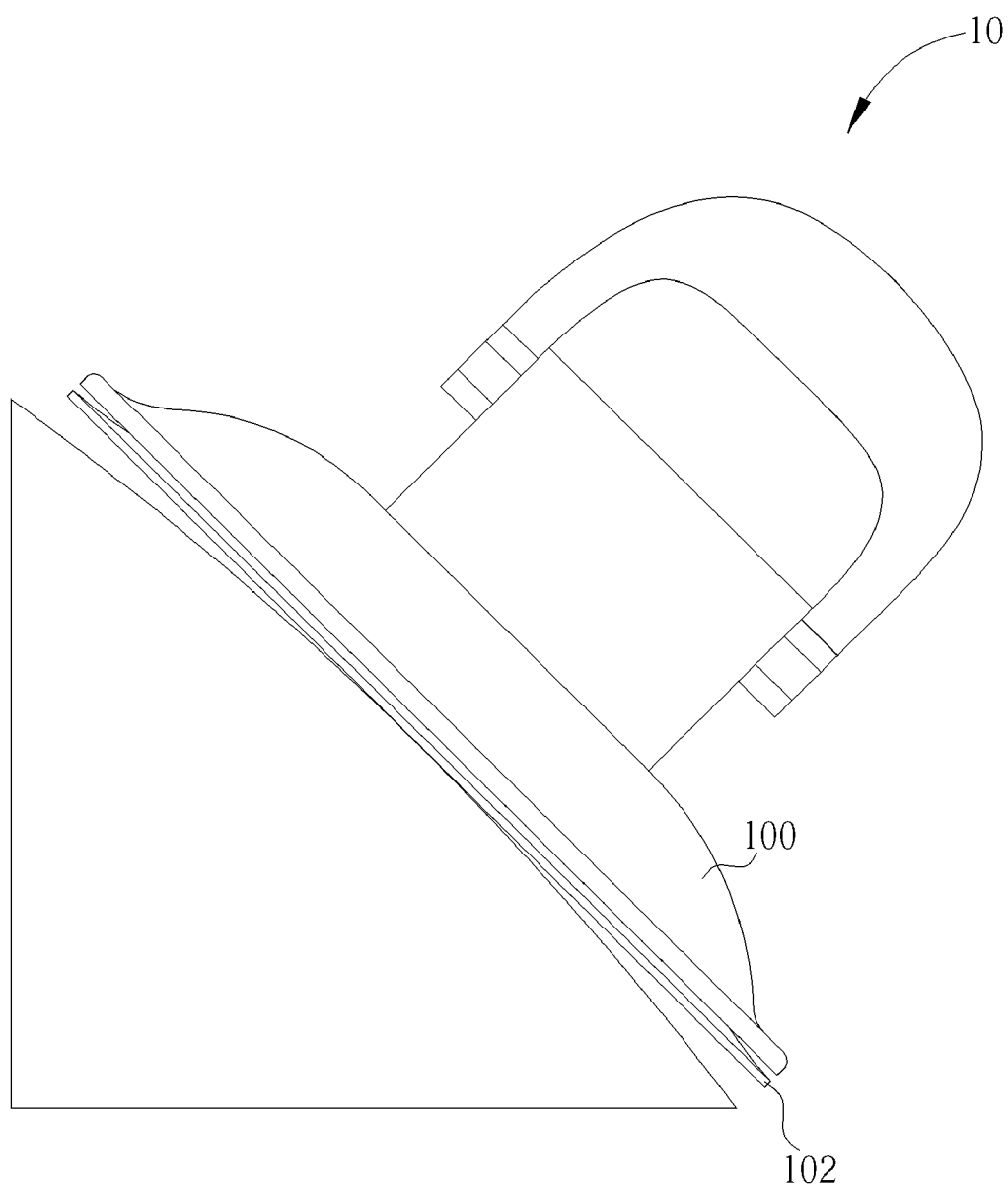
FIG. 2 is a side view diagram of the suction device when attaching to a curved surface.
Figure 5:
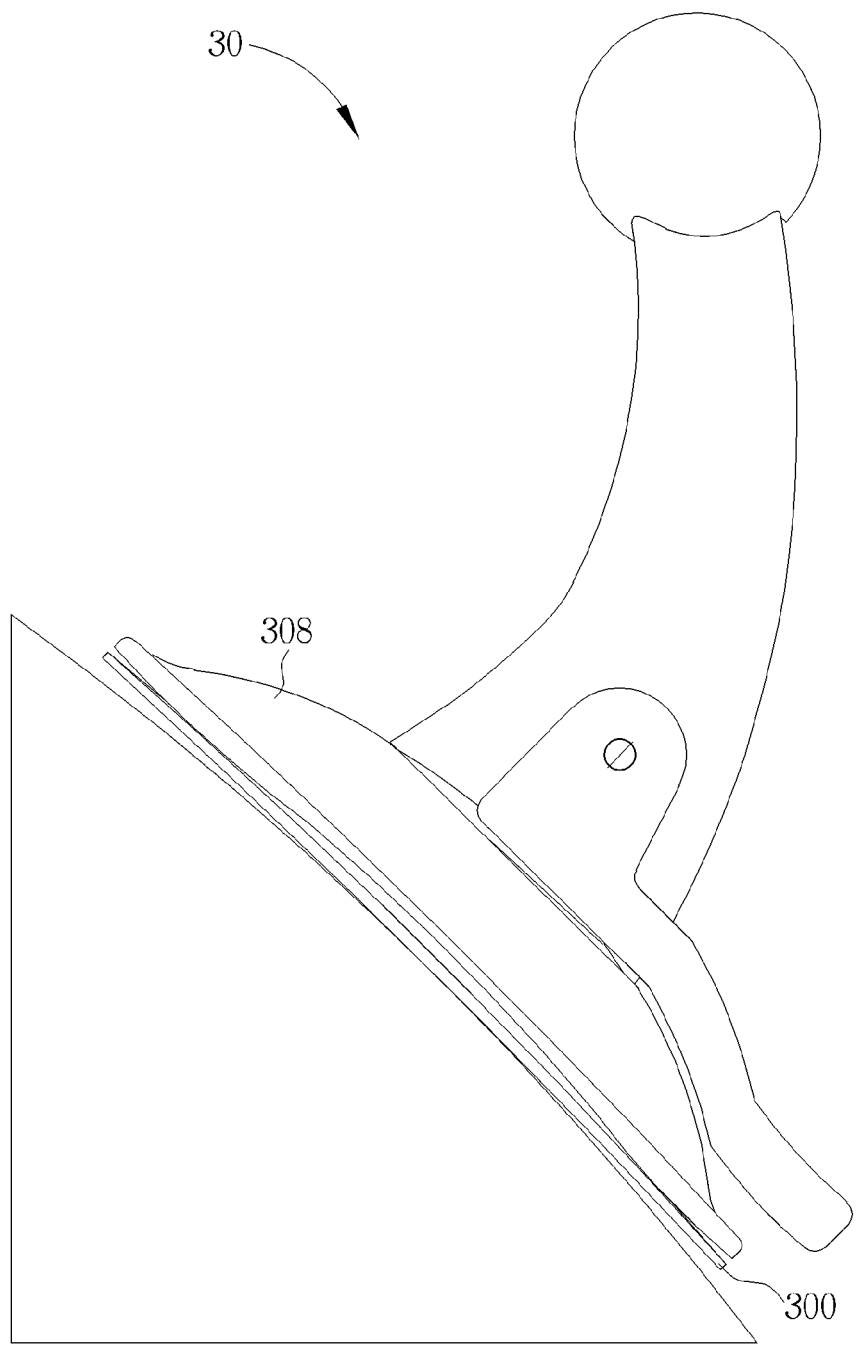
FIG. 5 is a side view diagram of the suction device in FIG. 3 when attaching to a curved surface.

The conventional suction device only includes a support cap and there is no gap in the rim of the support cap. As shown in FIG. 2, when the conventional suction device attaches to the curved surface, the support cap can not keep the suction cup attaching to the curved surface closely, resulting in poor suction functionality, such that the applications of the conventional suction device are limited. Please refer to FIG. 5, which is a side view diagram of the suction device 30 attaching to a curved surface. Compared with FIG. 2, when the auxiliary support cap 306 and the main support cap 308 of the suction device 30 are combined by relative rotation and the gaps 366 and the gaps 386 are overlapped, the space saved by the gaps 366 and the gaps 386 makes the suction cup 300 to attach to the curved surface more closely. On the other hand, when the auxiliary support cap 306 and the main support cap 308 of the suction device are combined by different relative rotation and the gaps 366 and the gaps 386 are not overlapped, the auxiliary support cap 306 and the main support cap 308 fully support the suction cup 300, so that the suction cup 300 can stably attach to a plane surface normally without air leakage due to the gaps in the rim of the support caps.

Please continue to refer to FIG. 3 and FIG. 4. The sleeve 310 is connected with a center of the main support cap 308, for containing the vertical bar 302, and the sleeve 310 includes a pair of guiders 320, which the pin 316 can be horizontally placed through and move within vertically. Position of the through hole 328 on the rotation joint 326 corresponds to positions of the guiders 320 of the sleeve 310. The handle 318 of the linkage unit 312 includes a pair of through holes 332 formed on two arms of the handle 318 in a position corresponding to the guiders 320 of the sleeve 310. The pin 316 is placed through the through holes 332, the guiders 320, and the through hole 328, to combine the handle 318, the sleeve 310, and the vertical bar 302. By controlling the handle 318, the pin 316 is jointly moved downward or upward within the guiders 320, and the vertical bar 302 is jointly moved, so as to pull the suction cup 300 to enable or disable the suction functionality.

Figure 6:
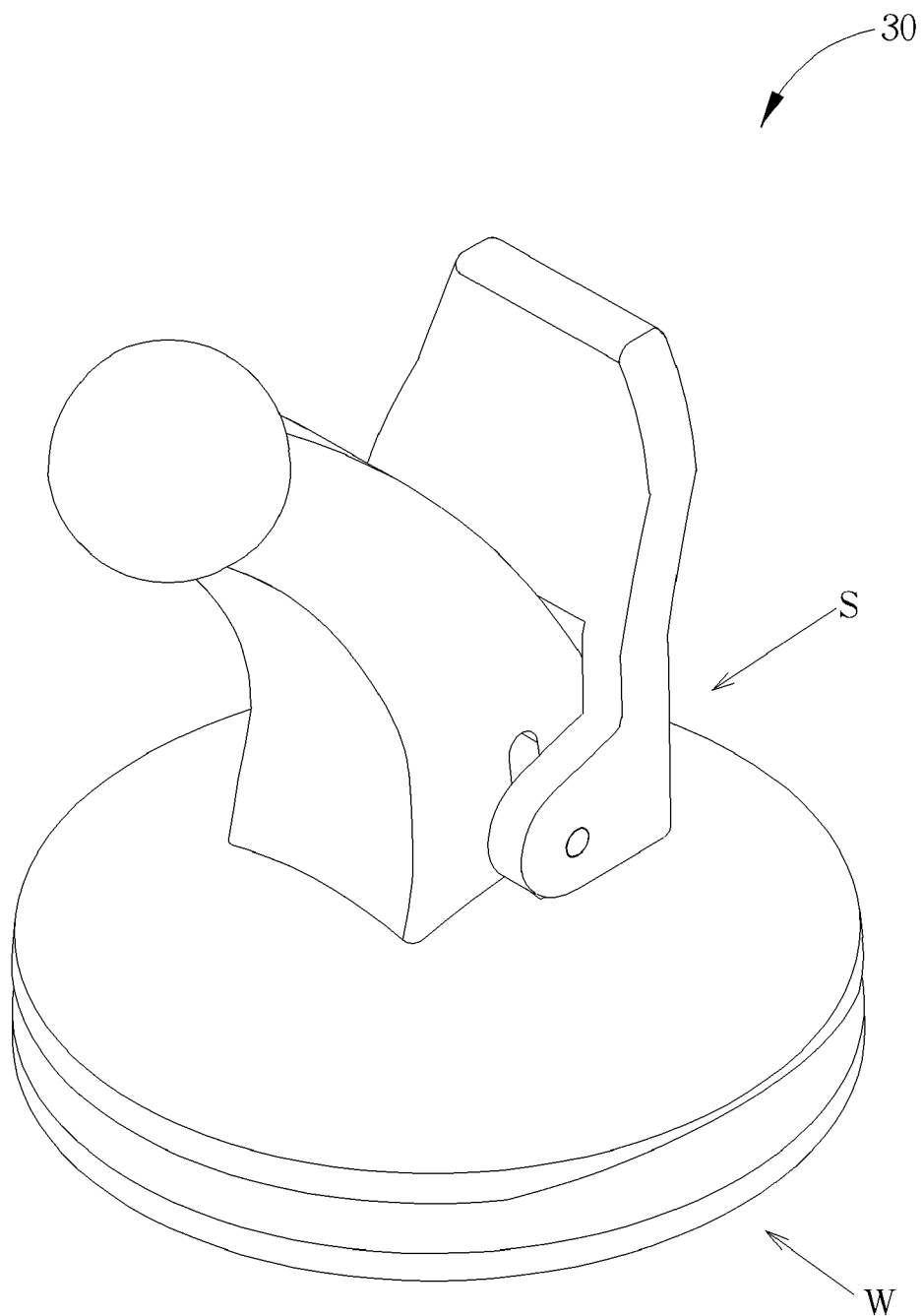
FIG. 6 is a three dimensional schematic diagram of the suction device in FIG. 3 when the suction functionality is disabled.
Figure 7:
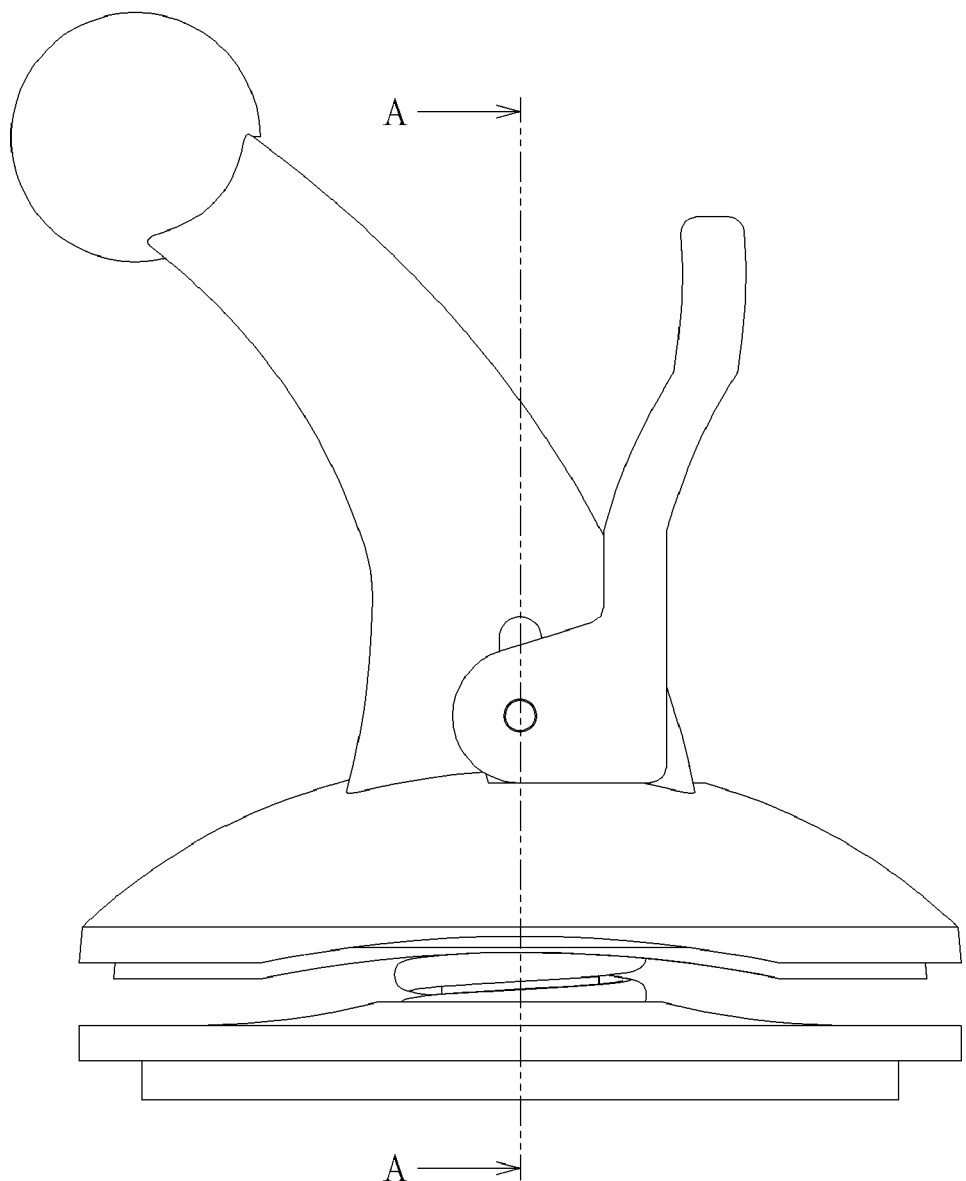
FIG. 7 and FIG. 8 are side view diagrams of the suction device in FIG. 6.
Figure 8:
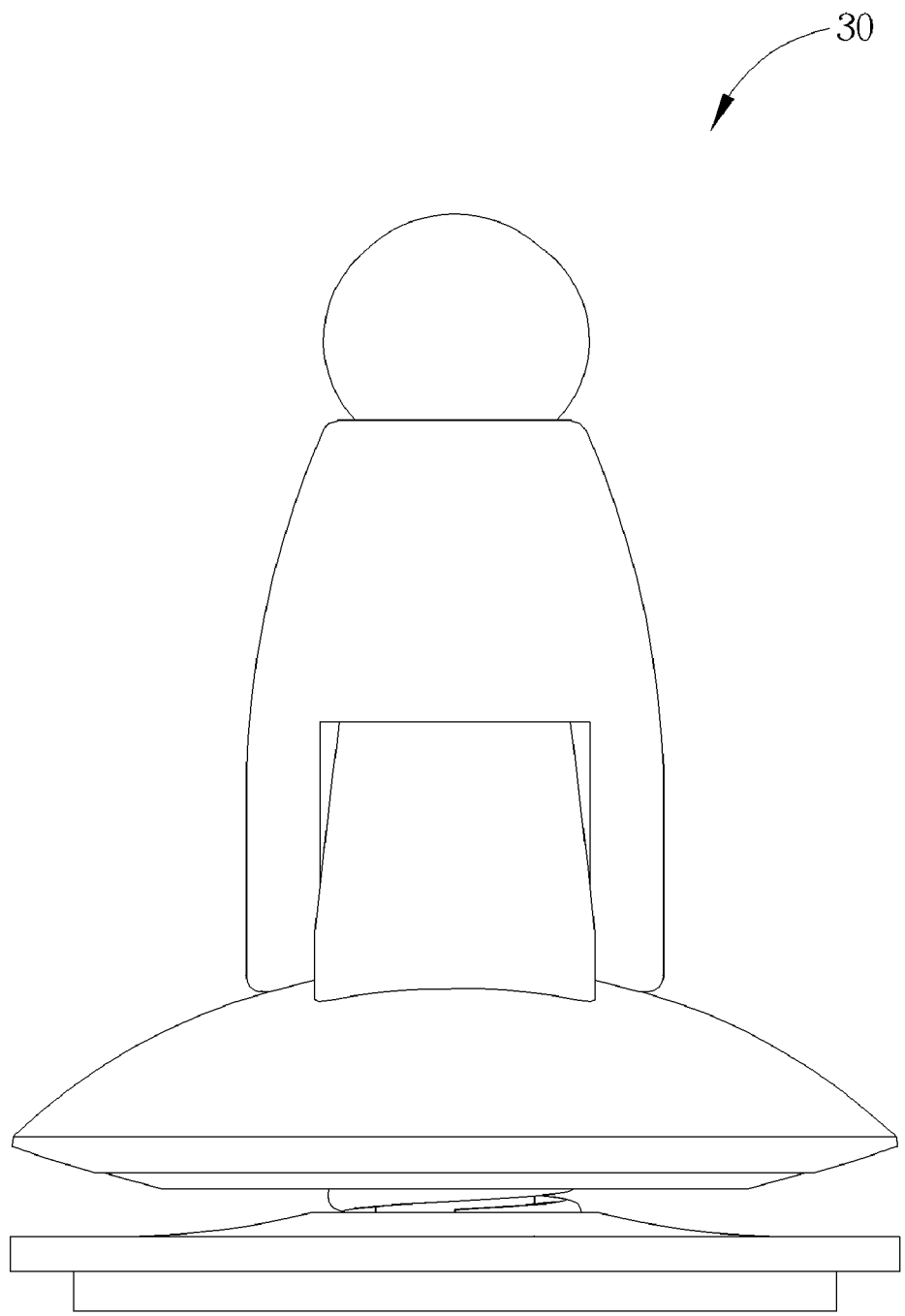
Figure 9:
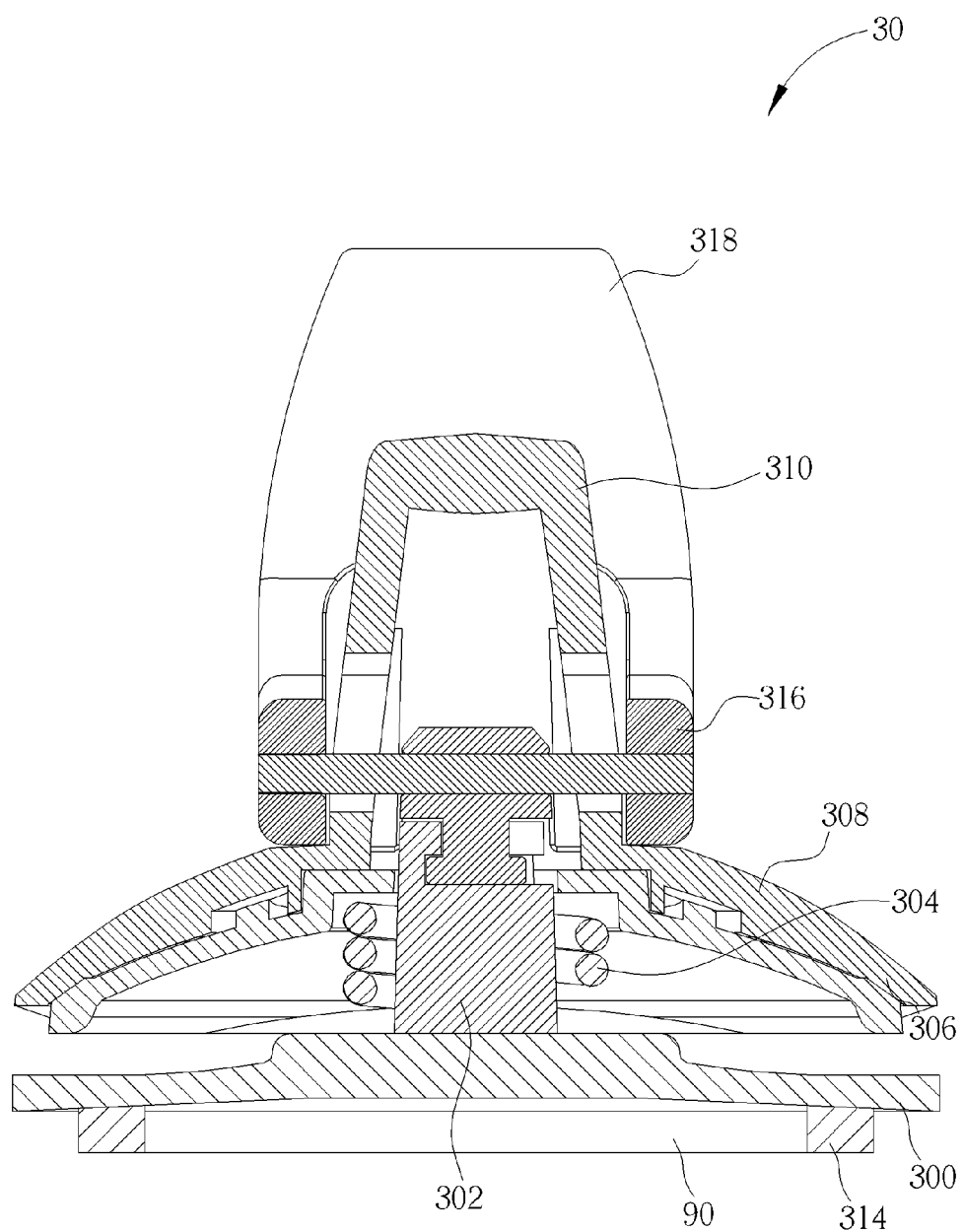
FIG. 9 is a section view diagram of the suction device in FIG. 6.
Figure 10:
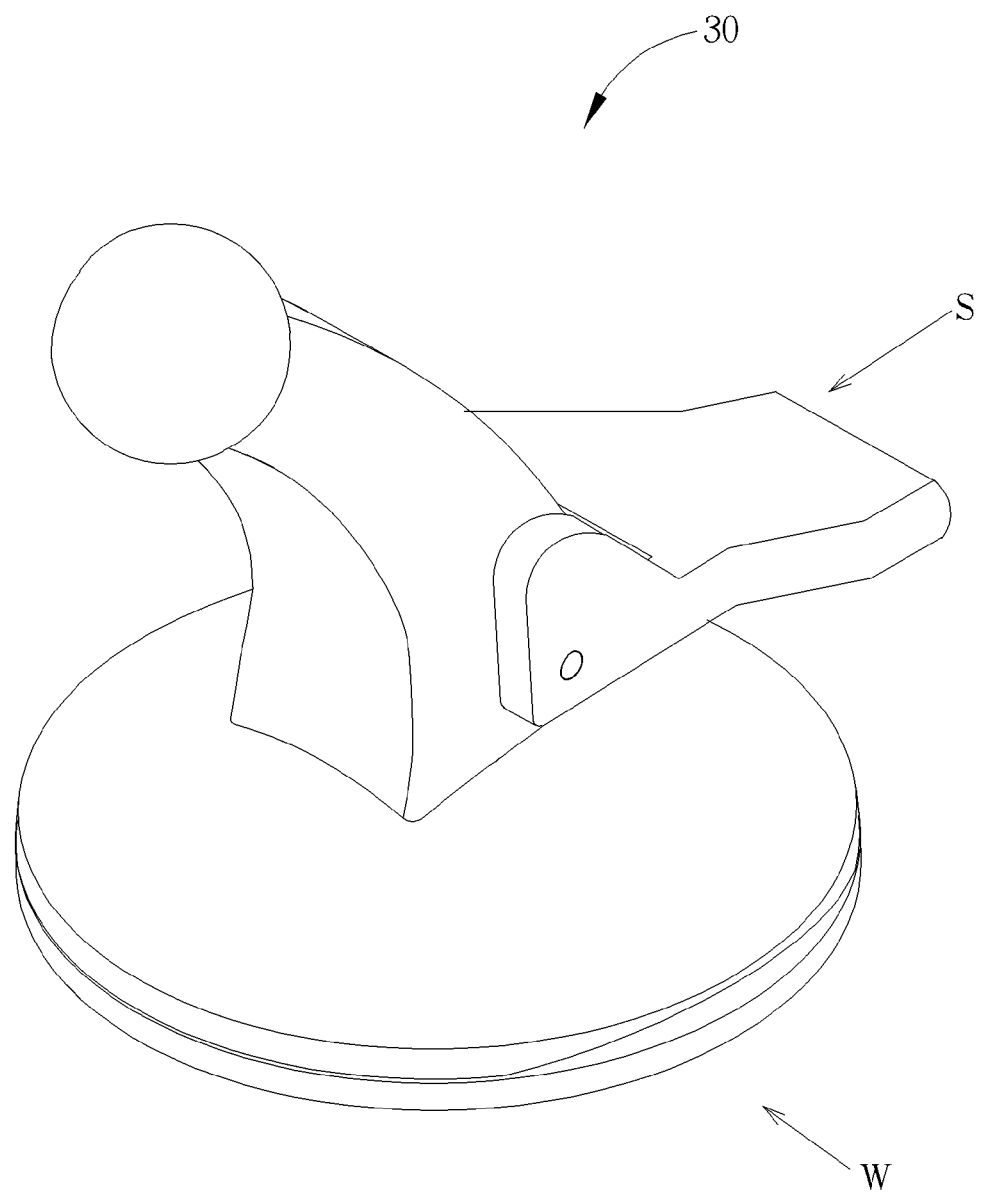
FIG. 10 is a three dimensional schematic diagram of the suction device in FIG. 3 when the suction functionality is enabled.
Figure 11:
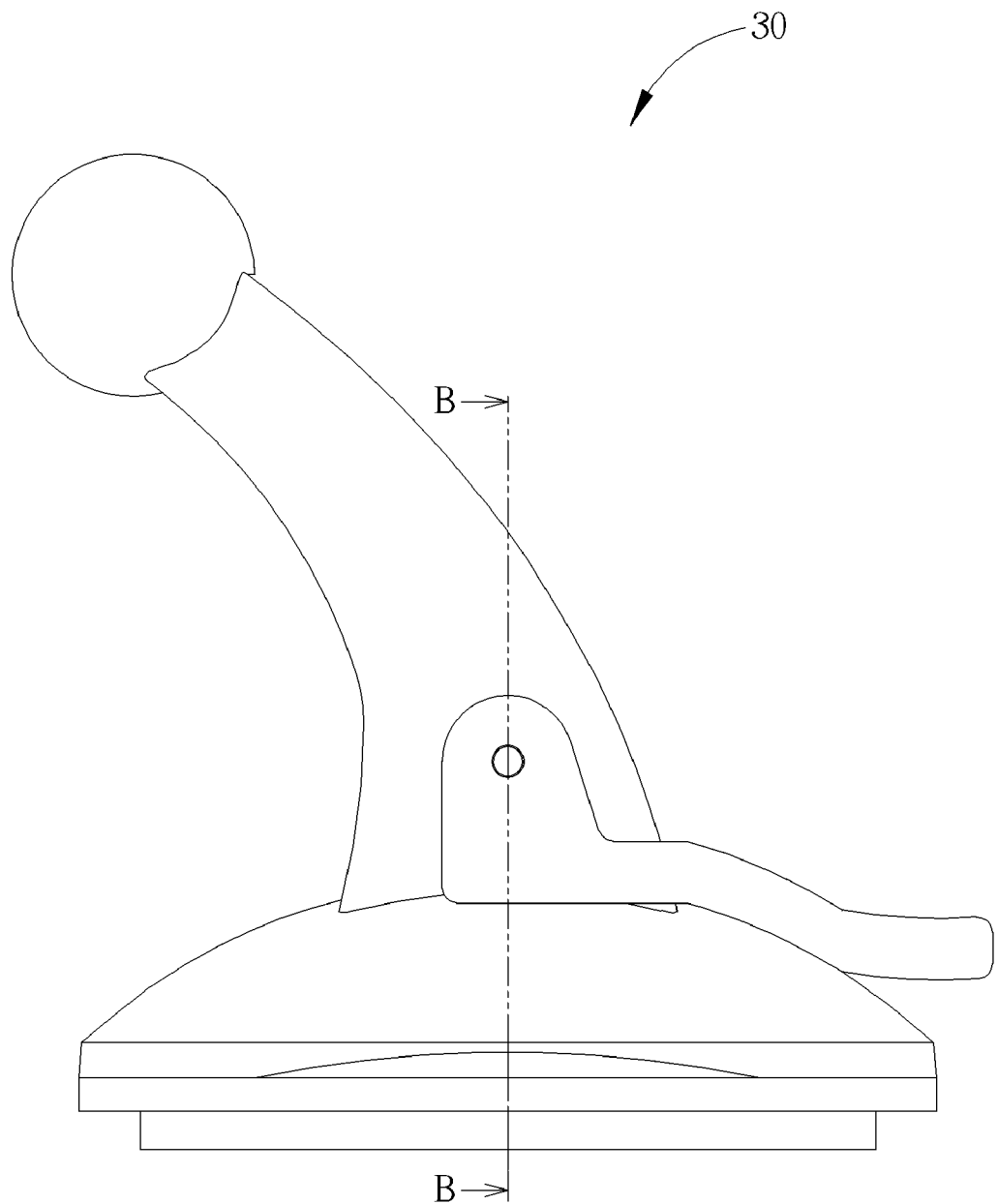
FIG. 11 and FIG. 12 are side view diagrams of the suction device in FIG. 10.
Figure 12:
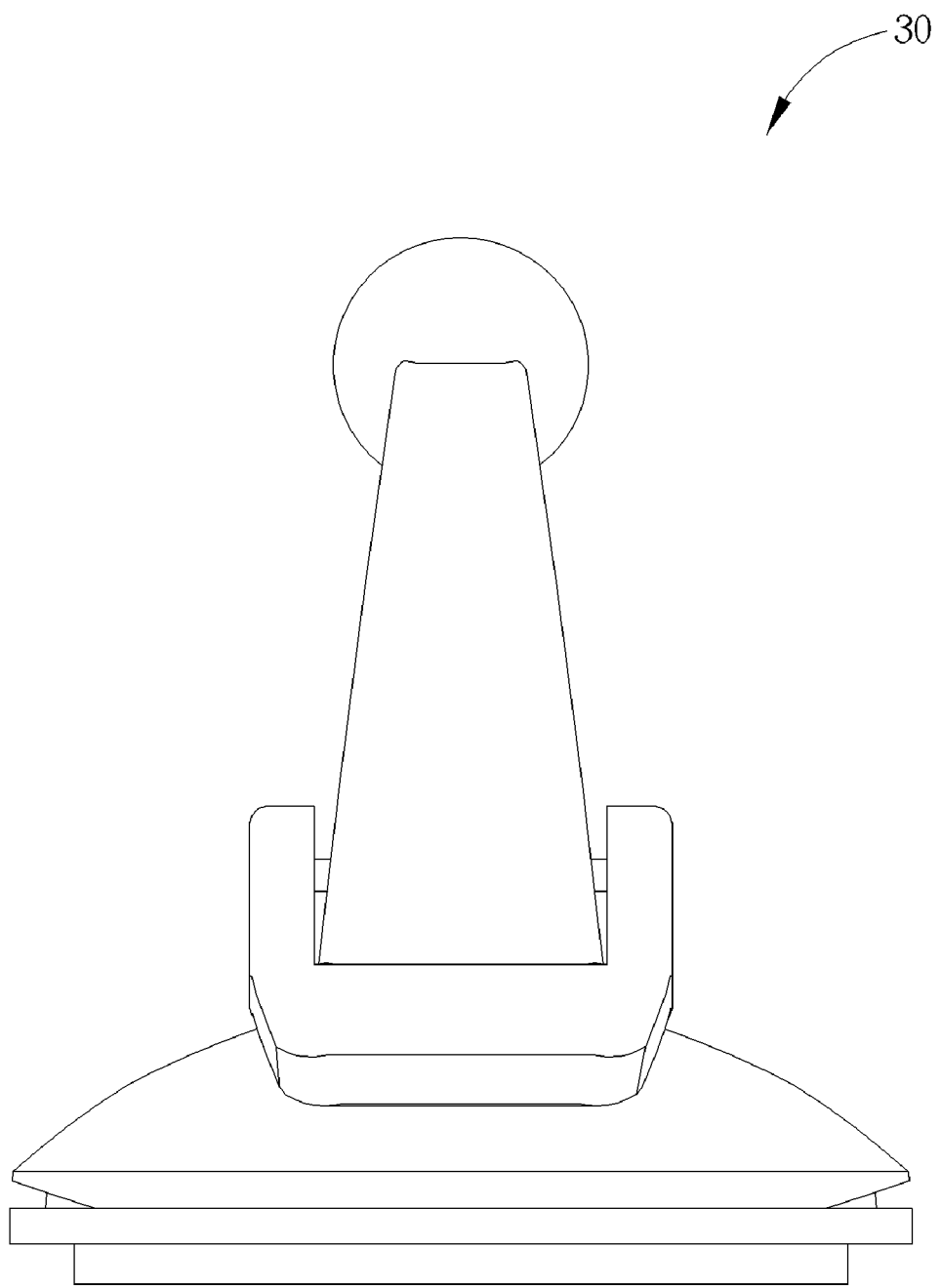
Figure 13:
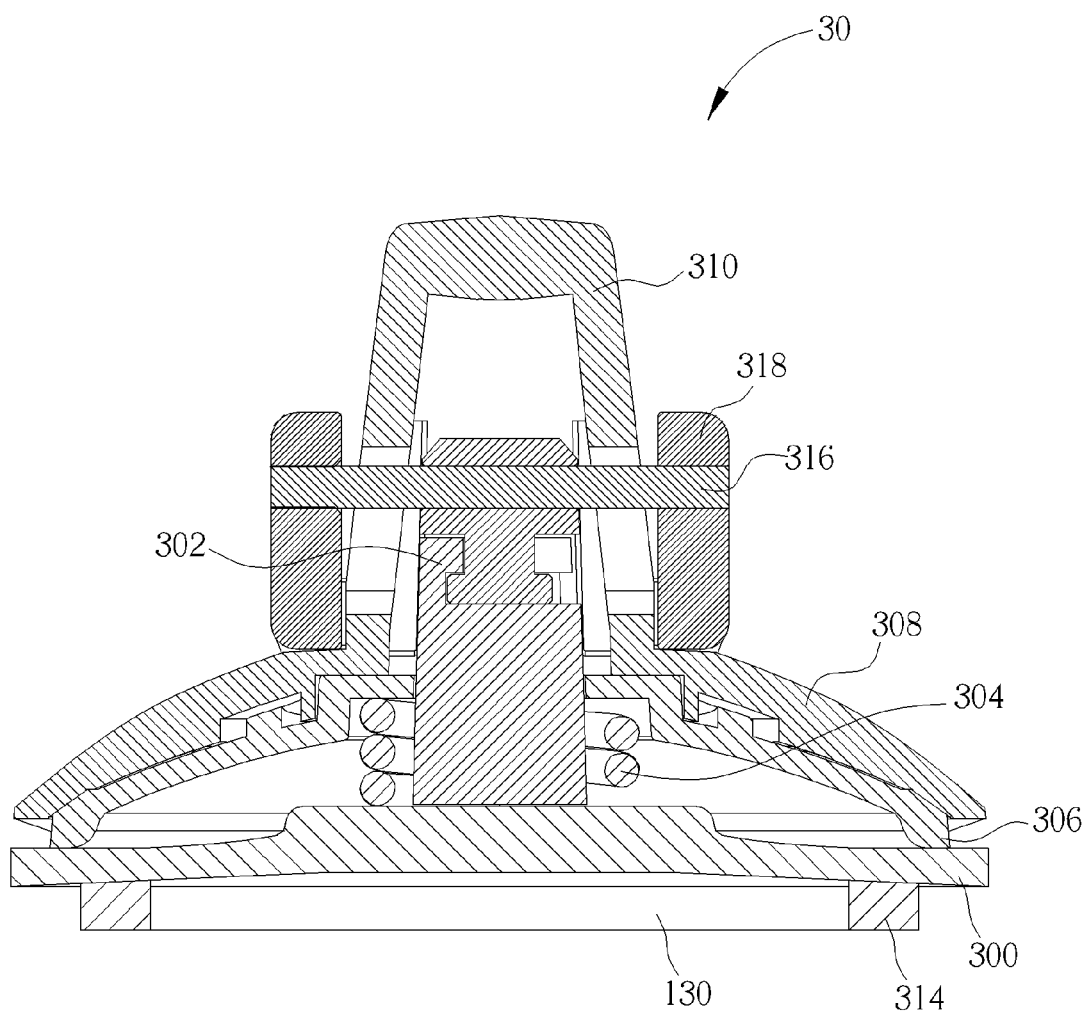
FIG. 13 is a section view diagram of the suction device in FIG. 10.

Please refer to FIG. 6 to FIG. 9, which illustrate forms of the suction device 30 in FIG. 3 when the suction functionality is disabled, and refer to FIG. 10 to FIG. 13, which illustrate forms of the suction device 30 when the suction functionality is enabled. FIG. 6 is a three dimensional schematic diagram of the suction device 30, which illustrates that the handle 318 is not pulled down. FIG. 7 is a side view diagram of the suction device 30 along a direction W in FIG. 6. FIG. 8 is a side view diagram of the suction device 30 along a direction S in FIG. 6. FIG. 9 is a section view diagram of the suction device 30 along a section line A-A. FIG. 10 is a three dimensional schematic diagram of the suction device 30, which illustrates that the handle 318 is pulled down and the suction functionality of the suction cup 300 is enabled. FIG. 11 is a side view diagram of the suction device 30 along a direction W in FIG. 10. FIG. 12 is a side view diagram of the suction device 30 along a direction S in FIG. 10. FIG. 13 is a section view diagram of the suction device 30 along a section line B-B in FIG. 11.

FIG. 9 and FIG. 13 illustrate status of the linkage unit 312. As shown in FIG. 9, when the handle 318 is not pulled down, the pin 316 is placed in the lower position of the guiders 320 and the vertical bar 302 is not jointly lifted; in this condition, the tension of the spring 304 forms a space 90 between the suction cup 300 and the attached surface, and the pressure inside the space 90 and the pressure outside the space 90 are equal, such that the suction functionality of the suction cup 300 is not enabled. As shown in FIG. 13, when the handle 318 is pulled down, the pin 316 moves upward and lifts up the vertical bar 302 jointly so as to pull the suction cup 300 away from the attached surface; in the meantime, the pressure inside a space 130 between the suction cup 300 and the attached surface is less than the pressure outside the space 130, such that the suction functionality of the suction cup 300 is enabled.

Figure 14:
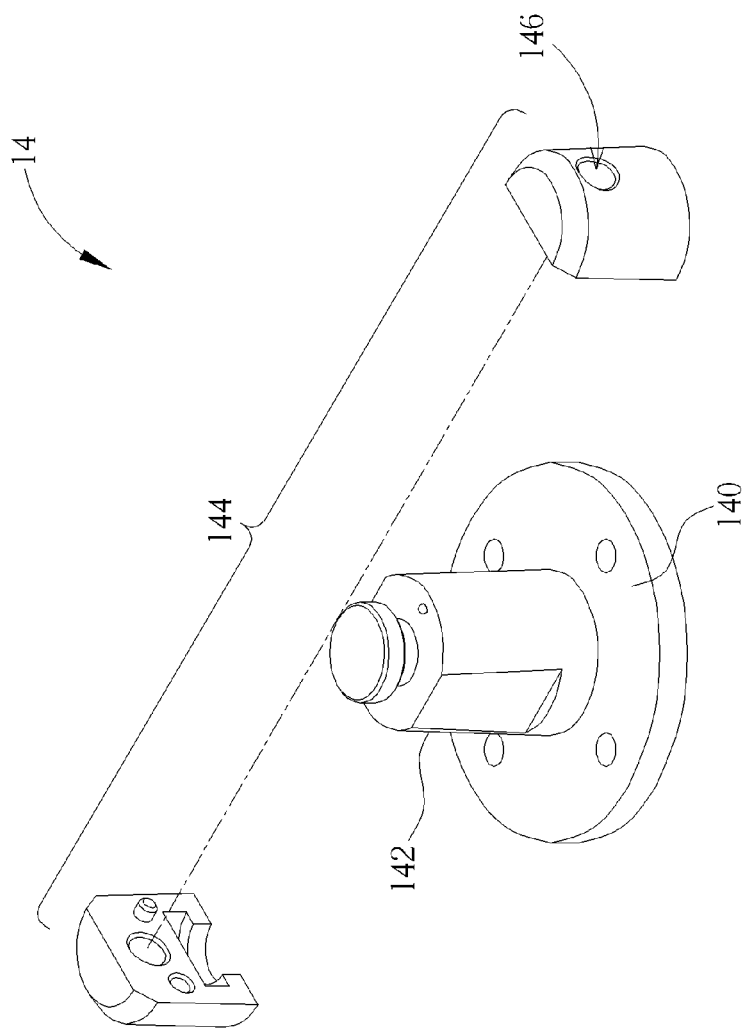
FIG. 14 is a three dimensional schematic diagram of a vertical bar of a suction device according to an embodiment of the invention.

Note that, the subject matter of the invention is the two complementary support caps of the suction device 30 and related applications. The structures and appearances of the vertical bar 302, the sleeve 310 and the linkage unit 312 in the above figures are merely exemplary embodiments, and do not limit the scope of the invention. Please refer to FIG. 14, which is a three dimensional schematic diagram of a vertical bar 14 for the suction device 30 according to an embodiment of the invention. The vertical bar 14 includes a base 140, a body 142, and a rotation joint 144, and can substitute the vertical bar 302 in FIG. 3. The base 140 is connected with the body 142 and installed in the suction cup 300. The rotation joint 144 has a horizontal through hole 146 of a size which the pin 316 can be placed through. The body 142 is a cylinder having one end connected with a center of the base 140 and the other end combined with the rotation joint 144, and the latter has a shorter diameter and includes a horizontal circular groove.

The rotation joint 144 is different from the rotation joint 326. The rotation joint 144 is formed by two equal portions which are horizontally combined, each portion having a boss, a hole complementary to the other boss on the opposite portion, and a groove for jointing the body 142. By the bosses, holes, and grooves included in the two portions of the rotation joint 144 and the circular groove of the body 142, the rotation joint 144 and the body 142 are combined. In addition, there are convex/concave portions on one side of the circular groove of the body 142 and their complementary concave/convex portions on the bottom plane of the rotation joint 144 (which is not shown in FIG. 14), by which the body 142 and the rotation joint 144 can be combined stably when the rotation joint 144 is rotated by specific angles. When the vertical bar 14 substitutes the vertical bar 302, the user can conveniently control the handle 318 to rotate the rotation joint 144 jointly via the pin 316 and rotate the main support cap 308 jointly at the same time, so as to expose or hide the gaps 366 of the auxiliary support cap 306 from the main support cap 308. Therefore, the suction device 30 using the vertical bar 14 in place of the vertical bar 302 is suitable for attaching to the curved surface.

Figure 15A:
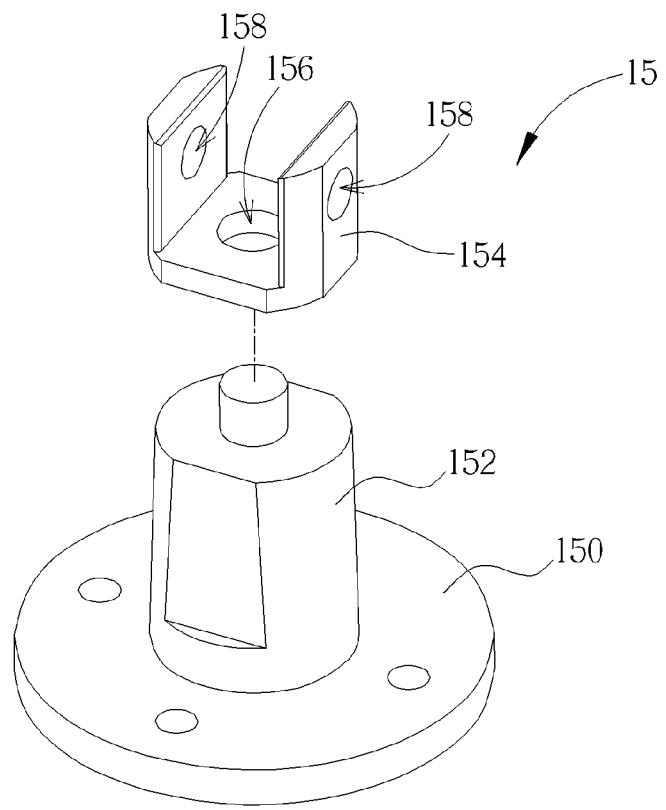
FIG. 15A and FIG. 15B are three dimensional diagrams of a vertical bar of a suction device according to an embodiment of the invention.

Please refer to FIG. 15A, which is a three dimensional diagram of a vertical bar 15 for the suction device 30 according to an embodiment of the t invention. The vertical bar 15 includes a base 150, a body 152, and a rotation joint 154, and can substitute the vertical bar 302 in FIG. 3. The base 150 is connected with the body 152 and installed in the suction cup 300. The body 152 is a cylinder divided into an upper part and a lower part with different diameters, and the lower part with a longer diameter is connected with the base 150. The rotation joint 154 is U-shape, and has a bottom plane with a vertical through hole 156. The upper part of the bar 152 can be placed through the through hole 156, such that the rotation joint 154 covers the body 152. The rotation joint 154 further has a pair of horizontal through holes 158 installed on two sides of the rotation joint 154, and the pin 316 can be placed through the through holes 158.

Figure 15B:
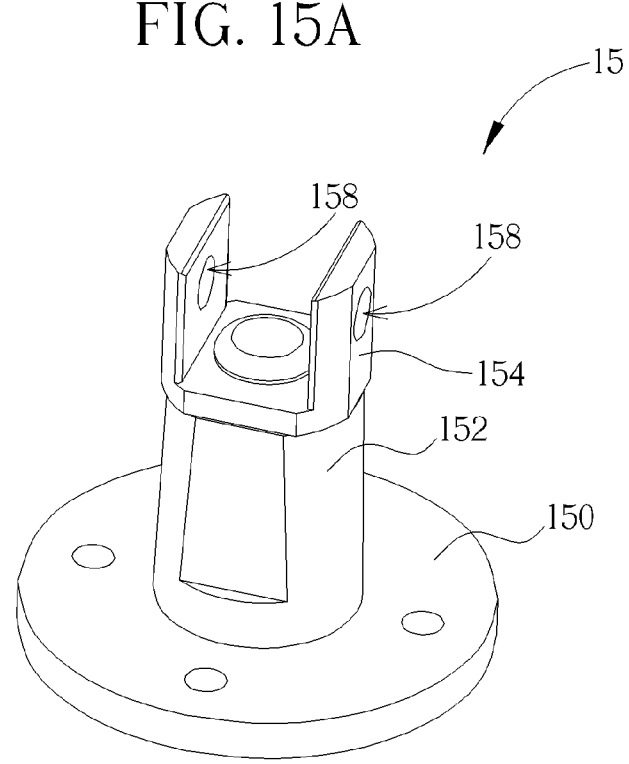
Figure 15C:
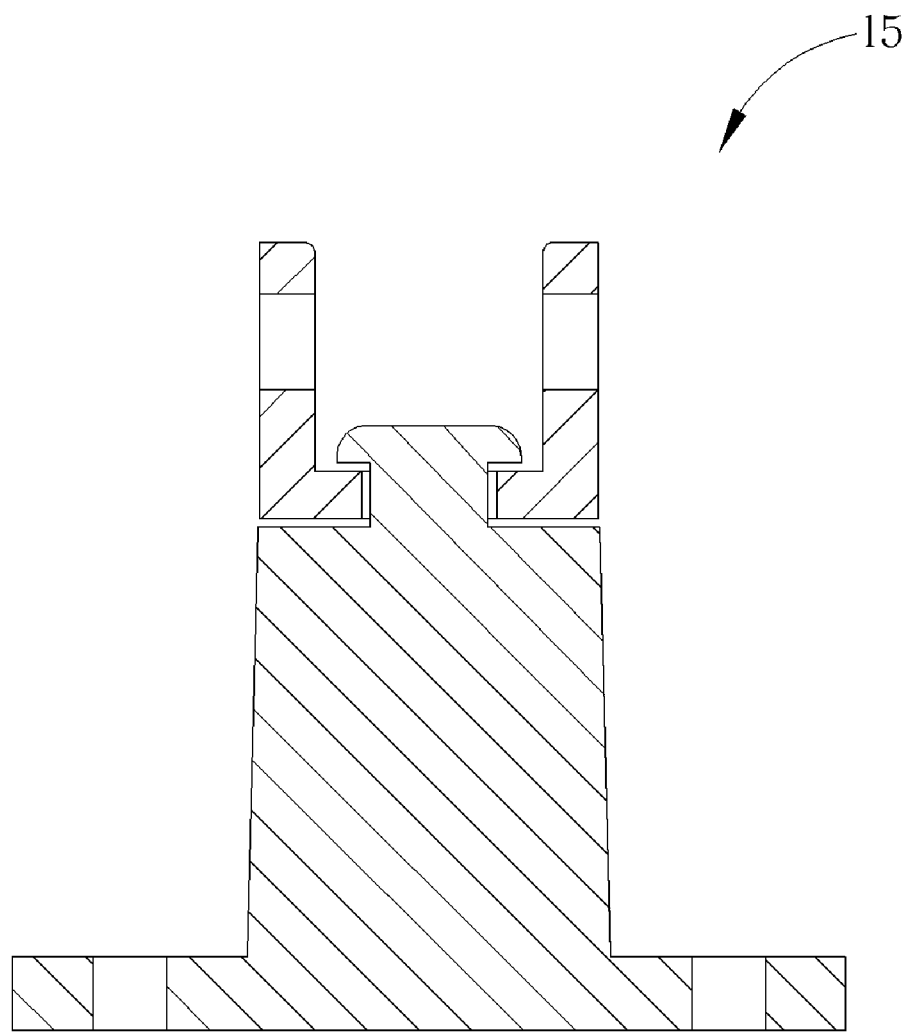
FIG. 15C is a section view diagram of the vertical bar in FIG. 15A.

Please refer to FIG. 15B, which is a three dimensional diagram of the vertical bar 15, indicating a state of the upper portion of the body 152 after a punch process is performed. Please refer to FIG. 15C, which is a section view diagram of the vertical bar 15. As can be seen from FIG. 15C, the rotation joint 154 and the body 152 are combined after the punch process, and a gap is formed between the rotation joint 154 and the body 152. The rotation joint 154 is jointly controlled by the pin 316. When the user moves the handle 318 leftward or rightward, the pin 316 is jointly controlled, and the rotation joint 154 and the main support cap 308 are therefore rotated at the same time, so as to expose or hide the gaps 366 of the auxiliary support cap 306 from the main support cap 308. Therefore, the suction device 30 using the vertical bar 15 in place of the vertical bar 302 is also suitable for attaching to the curved surface.

Figure 16A:
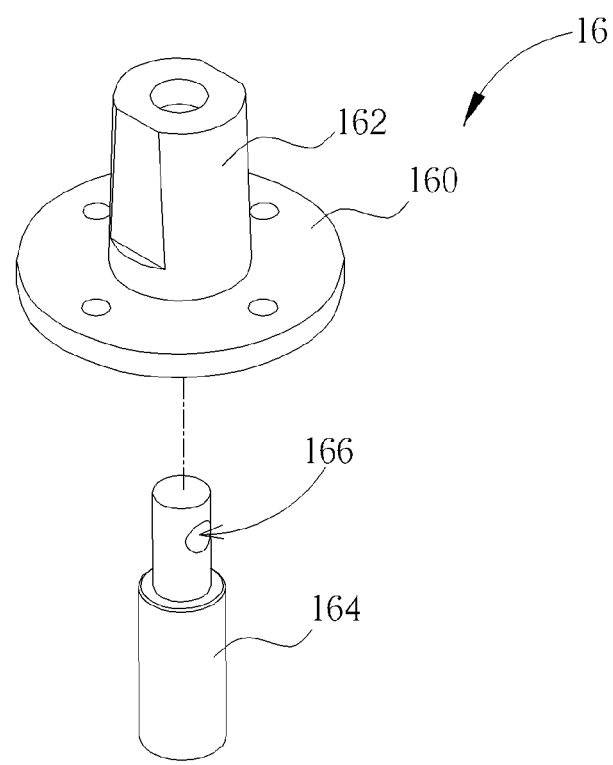
FIG. 16A is a three dimensional diagram of a vertical bar of a suction device according to an embodiment of the invention.

Please refer to FIG. 16A, which is a three dimensional diagram of a vertical bar 16 for the suction device 30 according to an embodiment of the invention. The vertical bar 16 includes abase 160, an external body 162, and an internal body 164, and can substitute the vertical bar 302 in FIG. 3. The base 160 has a circular opening at the center of the base 160, and is connected with the external body 162. The external body 162 is a hollow cylinder with openings on a top plane and a bottom plane. The internal body 164 includes two cylinders with different diameters, the diameter of the lower cylinder greater than that of the upper cylinder. The upper cylinder of the internal body 164 has a horizontal through hole 166, which the pin 316 can be placed through. The internal body 164 is placed through the openings of the base 160 and the bottom plane of the external body 162, such that the lower cylinder of the internal body 164 is put inside the external body 162, and the upper cylinder of the internal body 164 is further placed through the opening of the top plane the external body 162, put outside the external body 162.

Figure 16B:
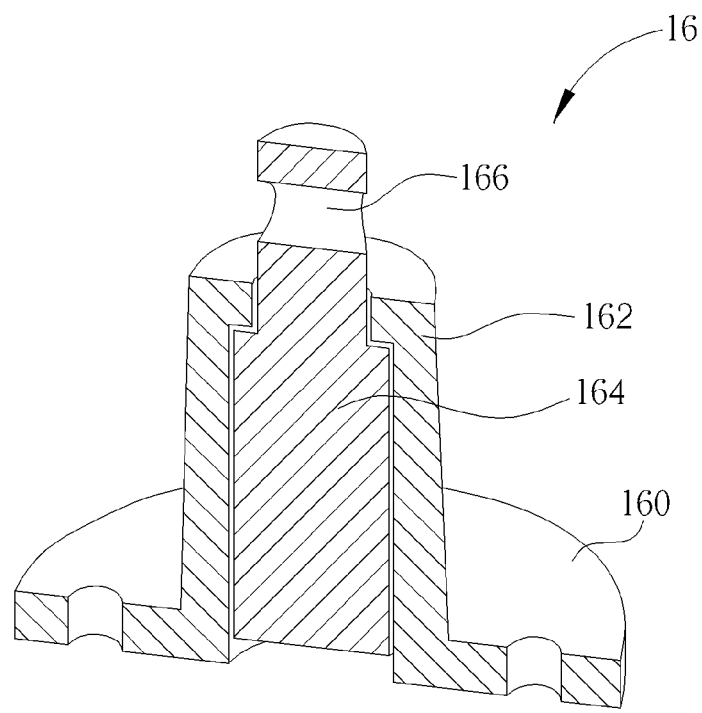
FIG. 16B is a section view diagram of the vertical bar in FIG. 16A.

Please refer to FIG. 16B, which is a section view diagram of the vertical bar 16. As shown in FIG. 16B, there is a gap between the external body 162 and the internal body 164, such that the internal body 164 can be rotated in the external body 162. When the user moves the handle 318 leftward or rightward, the pin 316 is jointly controlled, and the internal body 164 and the main support cap 308 are jointly rotated at the same time, so as to expose or hide the gaps 366 of the auxiliary support cap 306 from the main support cap 308. Therefore, the suction device 30 using the vertical bar 16 in place of the vertical bar 302 is also suitable for attaching to the curved surface. Note that the difference among the vertical bars 14, 15, 16, and the vertical bar 302 in FIG. 3 is that the rotating components of the vertical bar 15 and the vertical bar 16, i.e. the rotation joint 154 and the internal body 164, does not includes complementary convex/concave portions for determining the relative positions of the main support cap 308 and the auxiliary support cap 306. When the vertical bar 15 or the vertical bar 16 substitutes the vertical bar 302, the main support cap 308 can be further marked with rotating directions, such that the user can operate conveniently.

A form of the vertical bar for the suction device of the invention is not limited to the above exemplary embodiments, and those skilled in the art can make modifications or alterations accordingly. In addition, the linkage unit can be realized by a button or a knob and added with a cam mechanism to substitute the handle, so as to move vertical bar jointly to enable the suction functionality.

Figure 17:
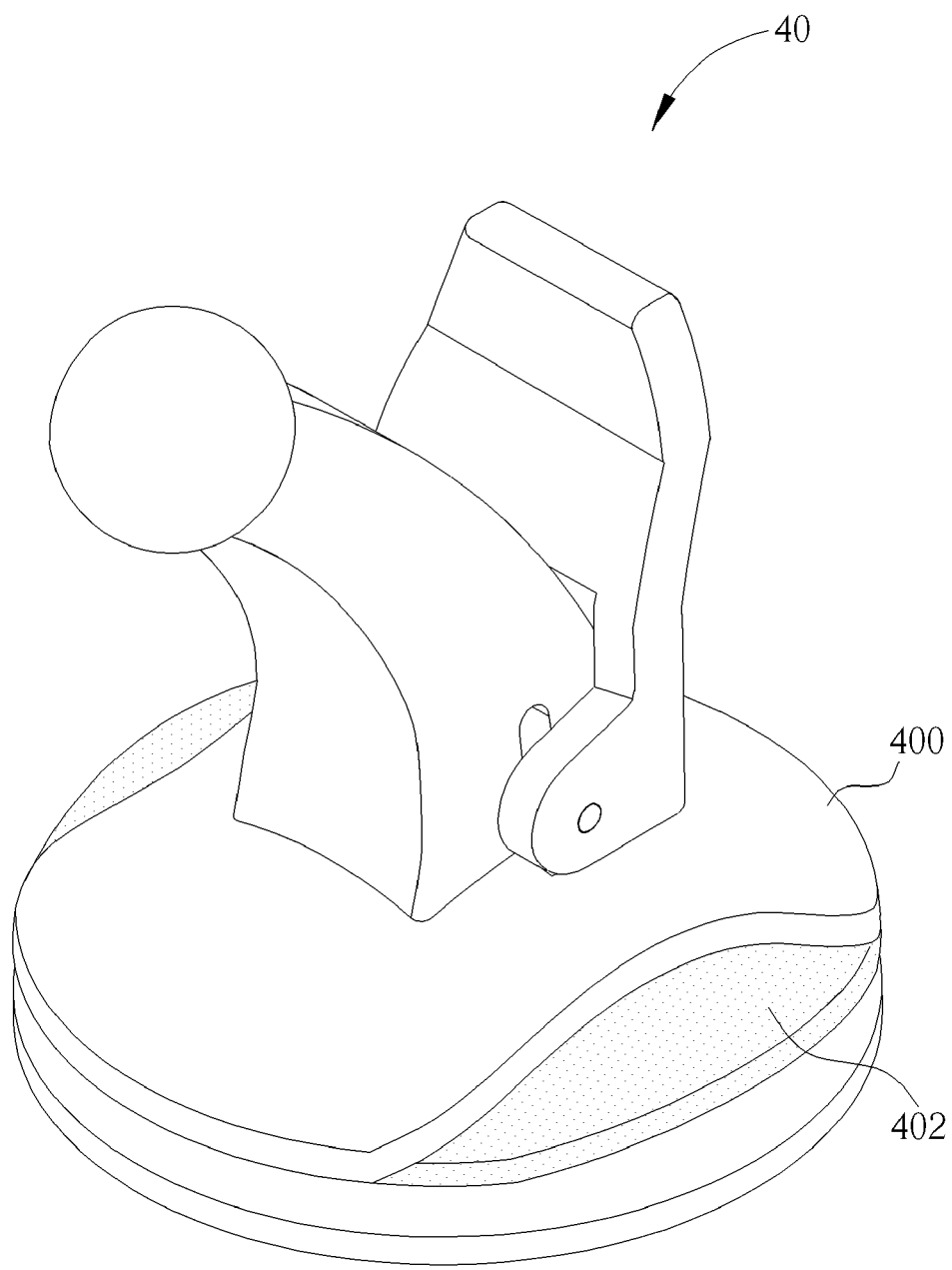
FIG. 17 is a three dimensional diagram of a suction device according to an embodiment of the invention.
Figure 18:
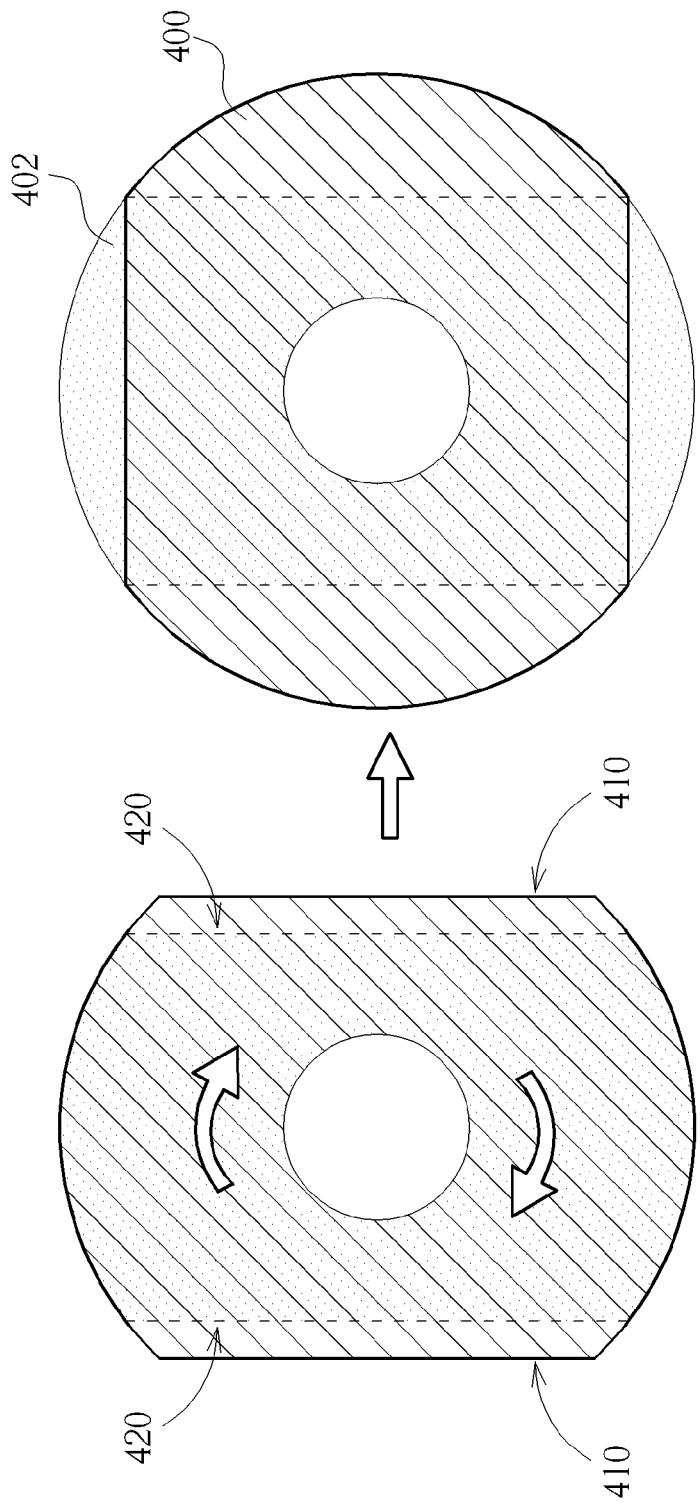
FIG. 18 is a plane diagram of a main support cap and an auxiliary support cap of the suction device in FIG. 17.

In the above figures, the gaps 366 of the auxiliary support cap 306 and the gaps 386 of the main support cap 308 are formed by slashing parts of the caps, such that the rims becomes thinner from the inside to the outside; seeing from the top of the suction device 30, appearances of the auxiliary support cap 306 and the main support cap 308 are still circular. In the alterations of the suction device 30, shapes of the gaps 366 and the gaps 386 are not limited to those in the above figures, and can be altered to different shapes. For example, please refer to FIG. 17 and FIG. 18. FIG. 17 is a three dimensional diagram of a suction device 40 according to an embodiment of the invention, and FIG. 18 is a plane diagram of a main support cap 400 (illustrated by the slash area) and an auxiliary support cap 402 (illustrated by the dot area) of the suction device 40. A pair of gaps 410 of the main support cap 400 and a pair of gaps 420 of the auxiliary support cap 402 are symmetrical with respect to the center of the support caps, and rims of the gaps 410 and the gaps 420 are straight lines. As can be seen from FIG. 18, when the main support cap 400 and the auxiliary support cap 402 are combined in different relative positions through relative rotation, the gaps 420 may be exactly under the gaps 410, or not overlapped, such that the main support cap 400 and the auxiliary support cap 402 can compensate for the lack of the support functionality that may be reduced by the gaps.

Figure 21:
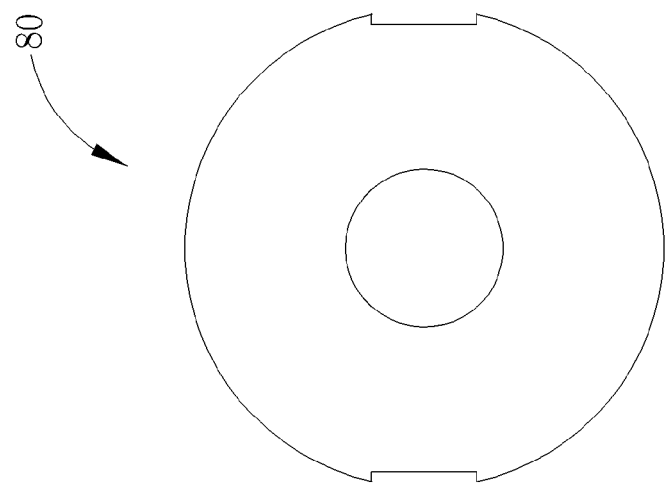
FIG. 19 to FIG. 21 are plane diagrams of support caps of a suction device according to embodiments of the invention.
Figure 20:
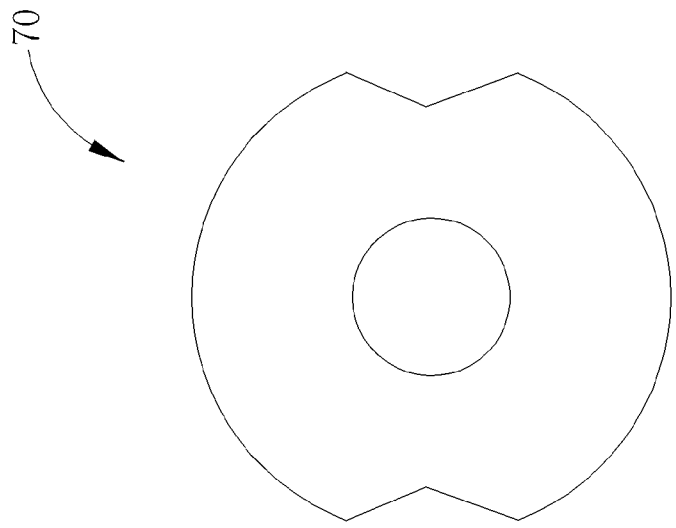
Figure 19:
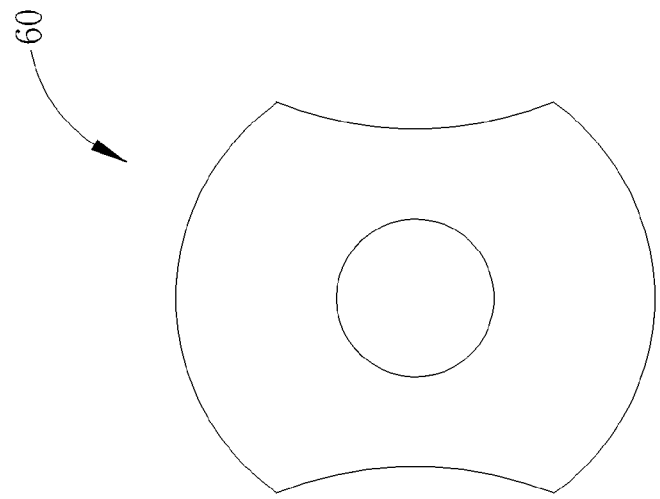

Please refer to FIG. 19 to FIG. 21, which are plane diagrams of support caps 60, 70, 80 of the suction device according to an embodiment of the invention. Rims of gaps of the support cap 60 are arc, rims of gaps of the support cap 70 are rectangular, and rims of gaps of the support cap 80 are triangular. The support cap 60, the support cap 70 or the support cap 80 can be utilized in the auxiliary support cap 306 or the main support cap 308 of the suction device 30. Those skilled in the art can make modifications or alterations of the support caps according to the aforementioned embodiments accordingly.

To sum up, the suction device of the invention includes two support caps with gaps. The support caps can be combined with each other indifferent relative positions through relative rotation, and therefore the suction device can attach to the curved surface preferably when the gaps overlap, and can attach to the plane surface when the gaps do not overlap. The suction device of the invention can be simply applied for hanging items or for any holding devices requiring a suction cup, such as a car holder, for attaching to the curved surface near the dashboard or any similar places preferably, and user convenience of the suction device is enhanced.

Those skilled in the art will readily observe that numerous modifications and alterations of the device and method may be made while retaining the teachings of the invention.

What is claimed is:

1. A suction device comprising:
a suction cup comprising a top plane and a bottom plane attaching to a surface;
a vertical bar installed with a through hole and connected with the suction cup, for pulling the suction cup;
a first support cap having an opening in a center of the first support cap which the vertical bar is able to be placed through and a first pair of gaps symmetrical with respect to the center in a rim of the first support cap;
a sleeve installed with a pair of guiders and connected with the first support cap, for containing the vertical bar;
a linkage unit combined with the sleeve and the vertical bar, for controlling the vertical bar to move in the sleeve to pull the suction cup, to enable a suction functionality of the suction cup; and
a second support cap installed between the suction cup and the first support cap, combined with the first support cap through relative rotation, and having an opening in a center of the second support cap which the vertical bar is able to be placed through and a second pair of gaps symmetrical with respect to the center of the second support cap in a rim of the second support cap.

2. The suction device of claim 1, wherein the second pair of gaps of the second support cap are exactly under the first pair of gaps of the first support cap when the first support cap and the second support cap are combined in a first predefined position through relative rotation.

3. The suction device of claim 2, wherein the second pair of gaps of the second support cap are greater than or equal to the first pair of gaps of the first support cap.

4. The suction device of claim 2, wherein the second pair of gaps of the second support cap and the first pair of gaps of the first support cap do not overlap when the first support cap and the second support cap are combined in a second predefined position through relative rotation.

5. The suction device of claim 1, wherein the linkage unit comprises:
 a pin placed through the pair of guiders of the sleeve and the through hole of the vertical bar; and
 a handle for controlling the pin to move in the pair of guiders of the sleeve, to jointly move the vertical bar so as to pull the suction cup.

6. The suction device of claim 1 further comprising a spring located between the suction cup and the second support cap, covering the vertical bar.

7. The suction device of claim 1 further comprising an adhesive unit installed on the bottom plane of the suction cup, for strengthening adhesiveness between the suction cup and the surface.

8. The suction device of claim 1, wherein the vertical bar comprises:
 a base combined with the suction cup;
 a body vertically connected with the base; and
 a rotation joint combined with the body, controlled by the linkage unit to be rotated relative to the body.

9. The suction device of claim 1, wherein the vertical bar comprises:
 a base installed in the suction cup;
 an external body which is hollow and vertically connected with the base; and
 an internal body installed within the external body, controlled by the linkage unit to be rotated relative to the external body.

\* \* \* \* \*